Jan. 5, 1954  L. E. SHAW  2,664,757
AUTOMATIC BELT TENSION TAKE-UP
Filed July 27, 1950  3 Sheets-Sheet 1
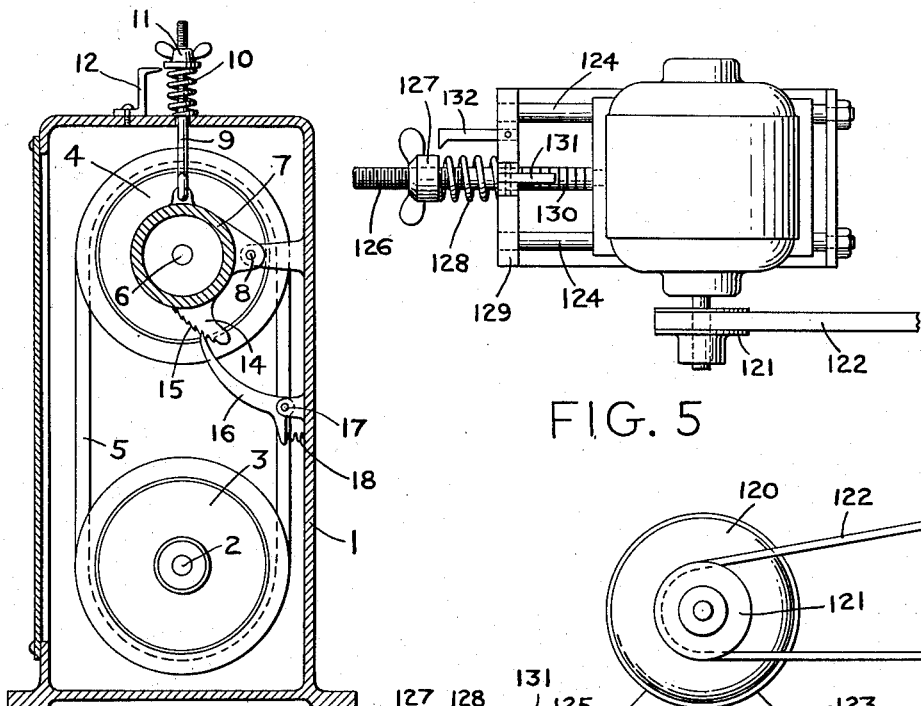
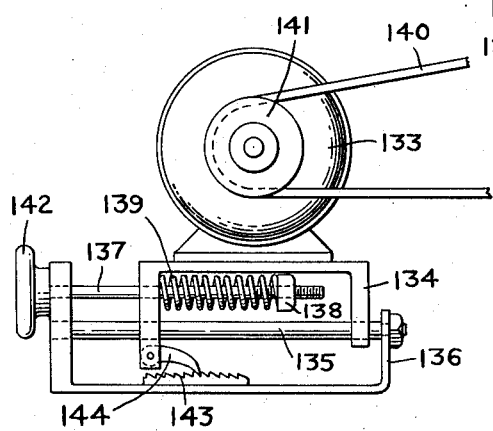
LOUIS EATON SHAW
INVENTOR.
BY *Robt Meyer*
*attorney*

LOUIS EATON SHAW
INVENTOR.

BY Robt Meyer
attorney

Jan. 5, 1954  L. E. SHAW  2,664,757
AUTOMATIC BELT TENSION TAKE-UP
Filed July 27, 1950  3 Sheets-Sheet 3

LOUIS EATON SHAW
INVENTOR.

BY *Robert Meyer*
 *attorney*

Patented Jan. 5, 1954

2,664,757

UNITED STATES PATENT OFFICE 2,664,757

AUTOMATIC BELT TENSION TAKE-UP

Louis Eaton Shaw, Newark, N. J.

Application July 27, 1950, Serial No. 176,093

2 Claims. (Cl. 74—230.17)

This invention relates to power transmissions of the belt and pulley type and more particularly to proper tension of a belt or belts under varied load conditions.

The power that can be transmitted by a given belt running over pulleys depends upon the speed of the belt, the co-efficient of friction between the belt and pulley surfaces, and the tension of the belt. Tension is an important factor because, if too great, friction losses mount and belt life declines. If it is too little, then slipping, heat and wear occur.

The ideal conditions for a belt drive are those under which the tension is varied with the load. In the case of a motor driving a line shaft or machine, this may be accomplished by mounting the motor on a pivoted base and using the reaction of the motor itself to produce the required tension.

In many instances, however, this is not possible. For example, in variable speed transmissions, such as shown in Patent No. 2,399,452 issued April 30, 1946, wherein three parallel shafts are connected by two belts, the intermediate shaft being adjustable towards or away from the other two for the purpose of providing the necessary adjustments of belt tension. In the structure of Patent No. 2,399,452, means are provided for indicating when the correct belt tension has been obtained, and once the correct adjustment has been made, parts are locked in position. From time to time thereafter as the belts wear and stretch, the parts should be unlocked and readjusted. Were the parts not locked in position after adjustment has been made, the spring would have to be strong enough to resist the pull of the belts under the greatest shock, starting or overload. In consequence, the belts would be operating most of the time under a tension much greater than necessary with the resultant loss of belt life and efficiency.

An object of the present invention is to provide an automatic belt tension take-up structure which is an improvement over the drive structure of the patent above referred to in that it automatically increases the distance between the shafts as the belts wear and stretch without subjecting the belts to excessive tension at any time, and also provides means for resisting shock loads.

With these and other objects in view, as may appear from the accompanying specification, the invention consists of various features of construction and combination of parts, which will be first described in connection with the accompanying drawings, showing an automatic belt tension take-up of a preferred form embodying the invention, and the features forming the invention will be specifically pointed out in the claims.

In the drawings:

Figure 1 is a simplified view of a belt and pulley or sheave transmission showing present invention applied thereto.

Figure 4 is a side elevation of a spring-operated motor base showing the present invention applied thereto.

Figure 5 is a top plan of the spring operated motor base shown in Figure 4.

Figure 6 is a side elevation of a modified form of the invention showing it applied to a spring-operated motor base.

Figure 2:
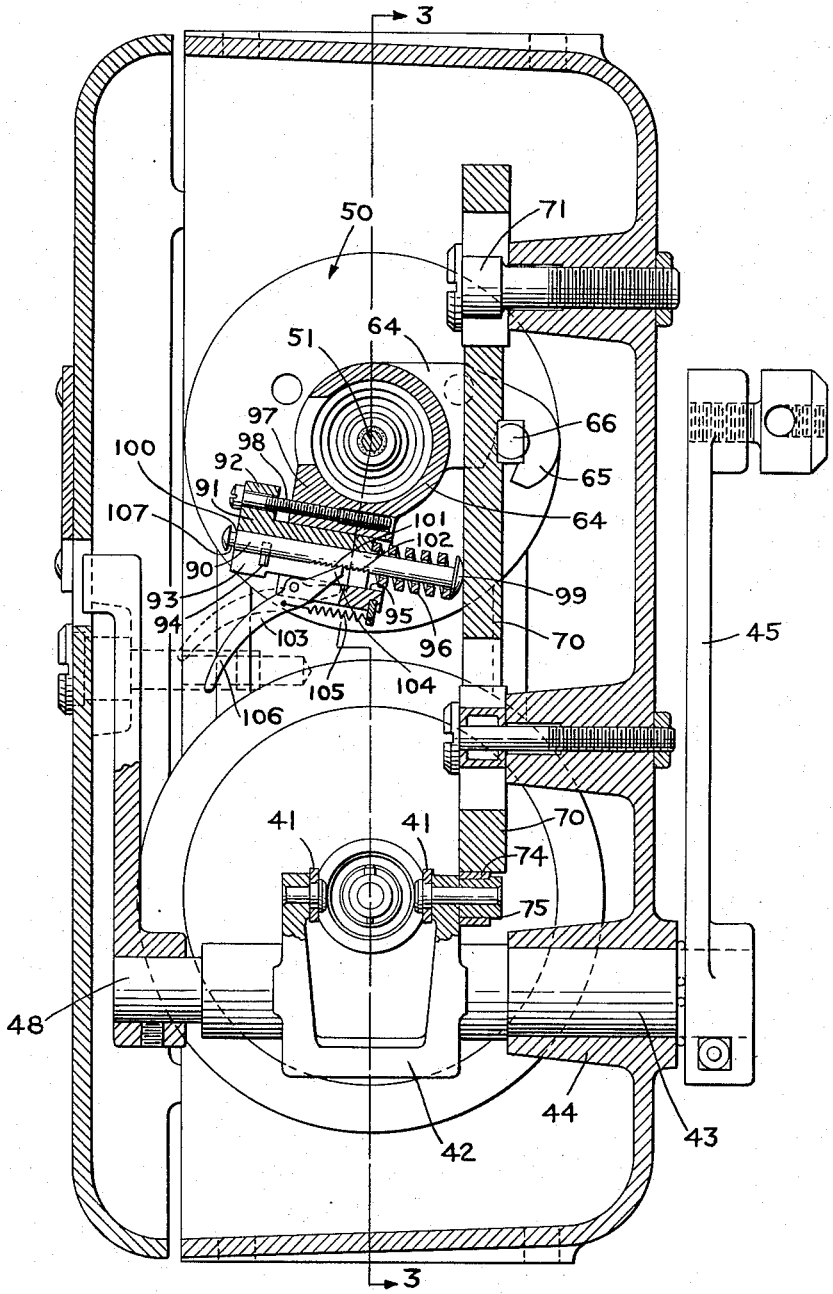
Figure 2 is a vertical section through a variable speed transmission showing the invention applied thereto and taken on the line 2—2 of Figure 3.

Hereafter, in the following specification and claims, wherever the term "pulley" or "sheave" is used, it is to be understood that the term applies equally to "pulleys," "V-grooved sheaves" or analogous elements of a power transmission.

Referring particularly to the illustration of the invention as shown in Figure 1 of the drawings, which is a simplified showing of the operating principle of the present invention, the drive structure includes a housing 1 carrying a shaft 2 on which a driving pulley 3 is mounted. The drive pulley 3 transmits power to the driven pulley 4 by means of a belt 5. The driven pulley 4 is mounted on a shaft 6 which is carried by a supporting bracket 7. The supporting bracket 7 is pivotally supported as shown at 8 from the housing 1. An eyebolt 9 is connected to the pivotally mounted bracket 7 and extends through the housing 1. A spring 10 is coiled about the eyebolt 9 exteriorly of the housing 1 and the tension of the spring 10 is regulated by means of a wingnut 11. The spring 10 engaging the wingnut 11 and being tensioned thereby tends to raise the bracket 7 and pulley 4 on the pivot 8 against the resistance of the belt 5 and thus apply tension to the belt. It is evident that, the more the spring 10 is compressed the greater will be the belt tension; and if the compression curve of the spring 10 is known a pointer 12 may be provided, of such a height as to indicate the correct degree of compression of the spring and, consequently, the correct tension for the belt 5.

The bracket 7 has an arcuate rack 14 attached thereto, the teeth 15 of which are engaged by a pawl 16. The pawl 16 is pivotally supported at 17 and a spring 18 engages the pawl to urge it into engagement with the teeth 15.

As the driven pulley 4 is being raised by the action of the spring 10 the pawl 16 successively engages the teeth 15 of the rack 14 and when the proper tension has been established there need be no further adjustment until the belt has worn and stretched sufficiently to allow the spring to lift above the pointer 12. The correct tension should then be restored by screwing down on the wingnut 11.

It will be seen that, while the driven pulley 4 is free at all times to move upwardly to the extent allowed by the belt 5, it cannot move downward under the influence of shock loads or overloads for a distance greater than the space between the adjacent teeth 15 of the rack 14 and since these spaces are purposely made small, it means, for all practical purposes, no movement at all.

Figure 3:
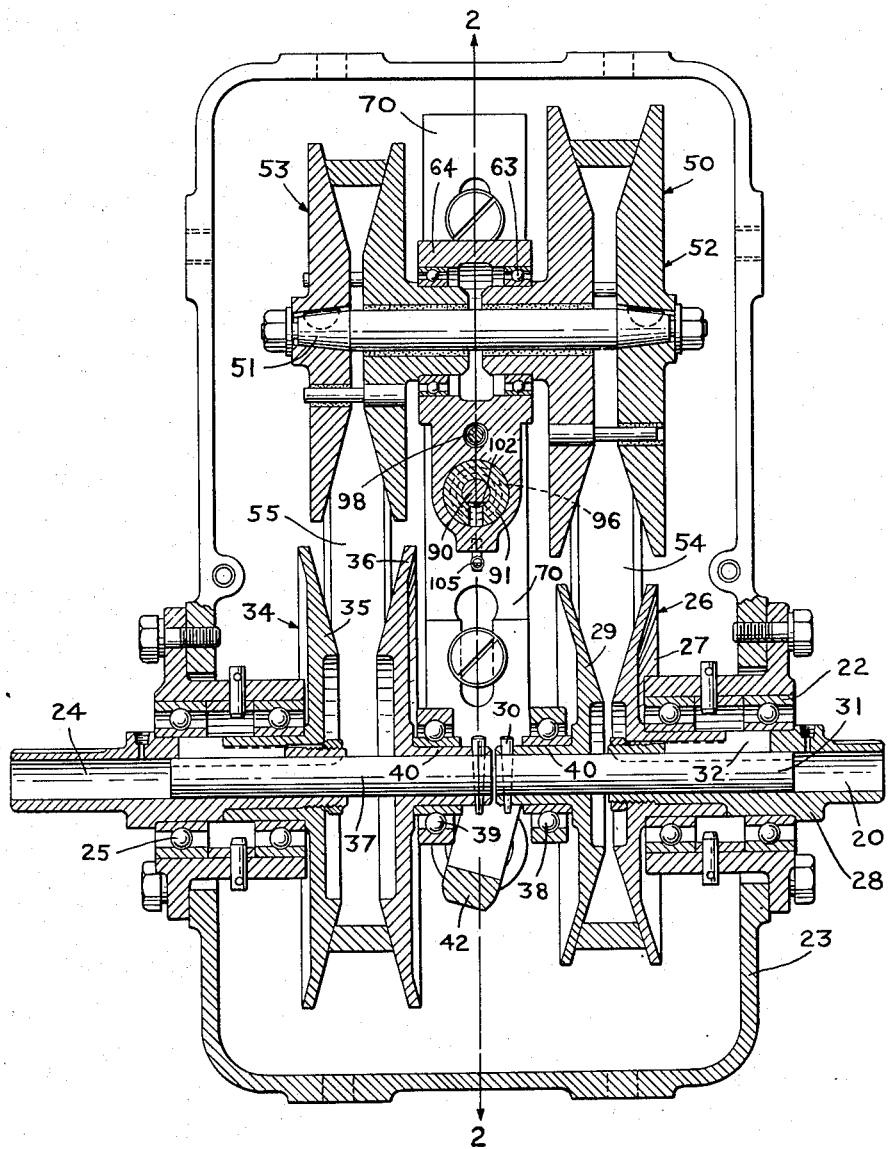
Figure 3 is a vertical section through the variable speed transmission shown in Figure 2 and taken at right angles to the section shown in Figure 2.

Referring particularly to the construction shown in Figures 2 and 3 of the drawings wherein a variable speed transmission of the type shown in Patent No. 2,399,452, issued April 13, 1946, is shown, and to which the present invention is applied.

The variable speed transmission shown in Figures 2 and 3 of the drawings comprises a drive shaft 20 rotatably supported by suitable bearings 22 carried by the housing 23 and driven shaft 24 which is also rotatably supported by suitable bearings 25 carried by the housing 23. The driving shaft 21 has an expansible sheave 26 mounted thereon for rotation therewith which sheave comprises the sheave section 27 mounted rigidly on the hollow section 28 of the driving shaft 20 for rotation therewith and the second cooperating sheave section 29. The second sheave section 29 is movable axially relative to the sheave section 27 for varying the width of the V-groove of the sheave as formed by the facing sides of the sheave sections 27 and 29. The sheave section 29 is pinned by means of a pin 30 to the stub shaft 31 which is connected to the hollow section 28 of the driving shaft 20 by means of a key 32 for rotation with the hollow shaft but for longitudinal movement relative thereto so as to permit variation in the size of the V-groove of the sheave.

The driven sheave 34 is of the same construction as the driving sheave 26, that is, it comprises a sheave section 35 which is connected to the driven shaft 24 for rotary movement therewith and which is held against axial movement, and a movable sheave section 36. The movable sheave section 36 is carried by a stub shaft 37 the latter being connected to the driven shaft 24 for rotary movement therewith in such manner as to permit axial movement relative to the driven shaft to vary the size of the V-groove in the sheave 34.

The movable sheave sections 29 and 36 have thrust bearings 38 and 39, respectively, mounted upon the hubs 40 of the sheave sections. As will be noted by referring to Figure 3 of the drawings, the movable sheave sections 29 and 36 are disposed in back-to-back relation with their hubs 40 extending towards each other.

Members 41 are rotatably carried by the arms of a U-bar 42 and engage against the thrust bearings 38 and 39. The members 41 may be in the form of rollers, blocks or other suitable structure. The U-bar 42 is journalled at one end to fit a suitable bearing 44 formed in the housing 23 and an actuating arm or lever 45 is connected to the extended portion of the trunnion 43 for rocking the U-bar 42 to shift the movable sheave sections 29 and 36 for varying the relative sizes of the V-grooves of the expansible sheaves 26 and 34 synchronously to provide variable speed ratios between the driving shaft 20 and the driven shaft 24 through the medium of the speed change unit generically indicated at 50.

The speed change unit 50 comprises a counter or jack shaft 51 on which is mounted a driven sheave 52 and a driving sheave 53. The driven sheave 52 is connected to the driving sheave 26 by means of a V-belt 54, while the speed change driving sheave 53 is connected to the driven sheave 34 by means of a similar conventional form V-belt 55.

The speed change driven and driving sheaves 52 and 53, respectively, are expansible, as are the driving and driven sheaves 26 and 34, in such manner as to permit movement of the sheave sections longitudinally of the axis of the shaft 51 independently of movement of the shaft, and in operation the movable sections of the sheaves 52 and 53 will move in the same axial direction with and in direct proportion to or synchronously with the movement of the movable sections 29 and 36 of the driving and driven sheaves 26 and 34, respectively, under operation of the arm or lever 45 such as to vary the speed ratio between the driving sheave 26 and the driven sheave 34 in direct proportion to the variation of the sizes of the V-grooves in the sheaves and the consequent variation in the arc radii of the V-belts as they pass about the sheaves.

The counter or jack shaft 51 is rotatably supported by means of suitable bearings 63 carried by the supporting member 64. The supporting member 64 is pivotally connected by means of an open hook 65 to the trunnion block 66 carried by a movable cam bar 70. As will be noted by particular reference to Figure 2 of the drawings, the pivotal hook member 65 is constructed so that the counter or jack shaft 51 and its companion structure may be lifted off its pivotal connection with the trunnion 66 which facilitates the changing of belts as well as the removing of the entire speed change assembly for the purposes of cleaning, reoiling, etc. While only one hook 65 is illustrated in the drawings, it is to be understood that two may be provided if necessary to properly support the floating speed change structure 50.

Adjustment of the sheaves 26 and 34 to vary the speed ratios between the driving and driven shafts 20 and 24 by regulating the widths of the V-grooves in the sheaves and consequently the radius in the grooves at which the V-belt engage, requires a variation, within relatively small limits however, of the distance between the axis of rotation of the arcuate ends of the belts. If no provision were made for correspondingly varying the distances between the axes of the driven and driving sheaves and the counter or jack shaft 51, it would result either in slipping of the belts or excess stress on the belts, depending upon the directional adjustment of the sheave sections with consequently excessive wear on the belts and decrease in efficiency of the drive. The invention disclosed in Patent No. 2,342,604 issued February 22, 1944, comprehends means for mechanically varying the distances between the axis of the driving and driven shafts and axis of the counter or jack shaft in proportion to the speed changing adjustments of the sheaves so as to eliminate the disadvantages above outlined. The mechanism shown in Figures 2 and 3 for automatically adjusting the distances between the axes of the countershaft and the driving and driven shafts is an improvement over the structure shown in the above mentioned patent and includes the cam bar 70 which is slidably supported by the casing 23 in any suitable manner as indicated at 71. The lower end of the cam bar 70 has a cam surface 74 formed thereon which engages the periphery of a cam roller 75 carried by the U-shaped bar 42. The cam roller 75 has its axis in alignment with the axis of the members or rollers 41 which are carried by the U-bar 42, so that the cam roller 75 will move in synchronism with the movement of the members 41, and consequently in unison with the movement of the movable sections 29 and 36 of the driving and driven sheaves 26 and 34. The movement of the cam roller 75 over the cam surface 74 of the cam bar 50 will move the cam bar longitudinally and consequently will move the counter or jack shaft 51 in direct proportion to the adjustment of the sheave sections 29 and 36 so as to vary the distance between the axes of the driving and driven sheaves 26 and 34 and the countershaft 51 for maintaining the belts 54 and 55 under the proper tension at all times. It is understood, of course, that the cam surface 74 on the cam bar 70 is accurately plotted so as to provide the proper movement of the countershaft 51 in relation to the driving and driven sheaves 26 and 34.

Adjustable means is provided for applying initial tension on the belts 54 and 55 and holding the floating countershaft 51 and the speed change gear mechanism carried thereby in adjusted positions relative to the cam bar 70 so as to provide, in effect, rigidity of position of the shaft and belt centers relative to the cam bar.

This mechanism comprises a rod or bar 90 which is slidably carried by a carrying sleeve 91. The sleeve 91 has an enlarged, substantially rectangular shaped head 92 formed thereon and is provided with a longitudinally extending slot 93 in which the pin 94 carried by the rod 90 engages to prevent turning movement of the rod 90 relative to the sleeve 91.

The sleeve 91 is slidably carried by an extension 97 formed on the bracket 64. An adjusting screw 98 is carried by the head 92 of the sleeve and threads into the extension 97 for adjusting the position of the sleeve relative to the extension 97 and also relative to the bar 90. When originally assembling the variable speed transmission the spring 96 is tensioned to provide a predetermined thrust in pounds to the rounded head 99 against the cam bar 70. The adjustment screw 98 is rotated to adjust the sleeve 91 relative to the rod 90 until the annular shoulder 100 formed on the rod 90 is brought into alignment with the outer finished end of the head 92 which indicates the correct position of the parts to provide proper tension on the belts 54 and 55.

In the event that the belts become loose through use, the spring 96 will act to take up slack in the belts by moving the bracket 64 upwardly on its pivot.

For the purpose of preventing downward pivotal movement of the bracket 64 and consequently the jack shaft 51 under shocks or excessive loads the rod 90 has a rack 101 formed thereon, the teeth 102 of which are spaced quite close together. A pawl 103 is pivotally carried by bracket 64 and its rack engaging end 104 is held in engagement with one of the teeth 102 of the rack 101 by a spring 105. The handle end 106 of the pawl 103 may be moved into the dotted line position shown in Figure 2 of the drawings for releasing the pawl from the rack 101 when desired. During operation of the drive, wear and stretching of the belts with the resultant upward movement of the bracket 64 and jack shaft 51 will be indicated by the position of the shoulder 100 relative to the outer finished face of the head 92, and when this shoulder has moved inwardly substantially the depth of the annular groove 107 in the bar 90 the adjusting screw 98 is adjusted to bring the parts back to their proper positions indicated in Figure 2 of the drawings. The pawl 103 engaging the teeth of the rack 101 will prevent downward movement of the driven pulleys and the jack shaft 51 as above specified. When the pawl 103 is moved out of engagement with the rack teeth 102 the bracket 64 is permitted to drop downwardly for the purpose of detaching the assembly from the cross bar 66, thus facilitating the removal and replacement of the belt or belts. The pin 94 engaging in the slot 93 serves to insure the proper assembly of the various parts of the device.

Figures 4, 5 and 6 of the drawings show the present invention applied to motor base mountings and with particular reference to the structure shown in Figures 4 and 5 of the drawings the driving motor 120 which carries the driving pulley 121 over which the belt 122 travels, is mounted upon a movable bracket 123. The bracket 123 is slidably supported by suitable rods 124 for movement along the rods to vary the tension of the belt 122.

A bar 125 is connected to the movable bracket 123 and has its outer end threaded as shown at 126. A nut 127 is threaded upon the end 126 and serves to tension a spring 128. The spring 128 is coiled about the rod 125 and engages the stationary base 129 and the nut 127 to urge the movable bracket 123 rearwardly to apply and maintain tension on the belt 122. The rod 125 has a rack 130 formed thereon comprising a series of small closely positioned teeth with which a pawl 131 cooperates. The pawl 131 is pivotally connected to the stationary frame 129 and engages the rack teeth to prevent movement of the movable base 123 and consequently of the motor 120 and pulley 121 in a direction opposite to the direction of tensioning movement of the base under action of the spring 128 thus preventing loosening of the tension on the belt under overload or shocks. A tension indicator 132 may be attached to the stationary base 129 for cooperation with the nut 127 to indicate the proper tensioning of the nut for providing the proper tension upon the belt 122.

In Figure 6 of the drawings a slight modification of the spring tension motor base mounting is shown. In this form the motor 133 is mounted upon a movable base 134 which is slidably supported by rods 135 carried by a rigid base 136. An adjustable rod 137 is carried by stationary base 136 and extends through the movable base 134. A nut 138 is threaded on the end of the rod 137 and is held against rotation by its proximity to a part of the movable base 134. A spring 139, coiled about the rod 137, engages the nut 138 and a part of the movable base 134 for applying tension to the belt 140 that moves over the driving pulley 141. The tension of the spring 139 is regulated by rotating the rod 137 through the medium of a rotating knob 142. A rack 143 is carried by the stationary base 136 and a pawl 144 is pivotally carried by the movable base 134 for engagement with the rack 143 to prevent movement of the movable base 134 in the direction opposite to its movement under action of the spring 139.

It will be understood that the invention is not to be limited to the specific construction or arrangement of parts shown, but that they may be widely modified within the invention defined by the claims.

What is claimed is:

1. In a variable speed drive of the V-belt type, the combination, of an expansible driving sheave, an expansible driven sheave, a speed change device therebetween including a counter shaft and expansible speed change driving and driven sheaves carried by said countershaft, belts connecting said driving and driven sheaves to said speed change sheaves, means for shifting said expansible driving and driven sheaves to vary the speed ratio therebetween, said speed change sheaves being automatically adjusted in conformity to the shifted adjustment of the driving and driven sheaves, means operated by said shifting means for varying the distance between the axes of the driving and driven sheaves and the axis of the speed change sheaves in predetermined ratio to the speed change shifting of the driving and driven sheaves, a bracket connecting said countershaft to said distance varying means to permit limited movement of the countershaft relative to the distance varying means, said bracket provided with an opening therethrough, a carrying sleeve adjustably mounted in said opening, a tensioning bar slidably carried by said sleeve and engaging said distance varying means, a spring carried by said bar and engaging said sleeve, said sleeve having a longitudinally extending slot therein, ratchet teeth formed upon said tensioning bar and facing said slot, a pawl pivotally carried by said bracket and extending through said slot and engaging said ratchet teeth, said pawl having an operating handle projecting outwardly beyond said slot.

2. A variable speed drive as claimed in claim 1 wherein said tensioning bar has an annular groove cut therein near its end remote from said distance varying means, said groove forming a shoulder for cooperating with the outer end face of said sleeve whereby when said shoulder becomes displaced with respect to the outer end face indication of necessary adjustment of said tensioning bar is indicated.

LOUIS EATON SHAW.

References Cited in the file of this patent

UNITED STATES PATENTS

| Number | Name | Date |
| --- | --- | --- |
| 1,673,762 | Chapman | June 12, 1928 |
| 1,783,987 | Thompson | Dec. 9, 1930 |
| 1,806,901 | Hawley | May 26, 1931 |
| 1,832,958 | Bachle | Nov. 24, 1931 |
| 2,215,831 | Heyer | Sept. 24, 1940 |
| 2,399,452 | Shaw | Apr. 30, 1946 |

FOREIGN PATENTS

| Number | Country | Date |
| --- | --- | --- |
| 908,245 | France | Apr. 3, 1946 |